Patented Mar. 16, 1948

2,437,752

UNITED STATES PATENT OFFICE 2,437,752

STABILIZATION OF FROZEN GRAPEFRUIT

John T. R. Nickerson, Wakefield, Mass., assignor to General Foods Corporation, New York, N. Y., a corporation of Delaware No Drawing. Application January 29, 1945, Serial No. 575,185

12 Claims. (Cl. 99—193)

This invention relates to the inhibition or prevention of the development of off-flavor in frozen grapefruit and to the resulting stabilized products.

Freezing is known to affect the flavor of certain fruits deleteriously. In some cases the effect of freezing is simply a pronounced loss of flavor, as in oranges and bananas. In the case of grapefruit, however, there is no perceptible loss of flavor produced by freezing, but there is developed an off-flavor which is so distasteful as to render this particular fruit unfit for human consumption, after thawing to the usual temperatures. The mechanism by which this off-flavor is produced is not known, but is certainly connected with freezing since it does not develop in the unfrozen fruit. It does not appear to be due to any ordinary type of terpene oxidation and is, in fact, more offensive than the usual bitter taste induced in terpene-containing materials by the action of oxygen. Many efforts have been made to prevent development of this off-flavor by the use of various known anti-oxidants such as gum guaiac, ascorbic acid, etc., but as far as I am aware none of such efforts has proved successful when the grapefruit has been frozen.

The fundamental object of the present invention is to inhibit effectively the development of the aforesaid off-flavor in frozen grapefruit, particularly in connection with the storage and marketing of grapefruit in frozen condition. Quick freezing methods are well known and have been successfully applied to such fruits as strawberries, raspberries and cherries the flavor of which is not impaired by freezing. The present invention makes it possible to handle grapefruit in the same way, thus permitting the addition of this fruit to the list of products which have already been successfully merchandized in quick frozen form. It is to be understood, of course, that the invention is not limited to quick freezing, but may be utilized in the freezing of grapefruit whatever method of freezing is employed.

I have discovered that, by treating the pulp or inner succulent part of grapefruit with substances selected from the group consisting of alkyl esters of caffeic acid of less than seven carbon atoms in the alkyl radical, hydrocaffeic acid, and alkyl esters of hydrocaffeic acid of less than eleven carbon atoms in the alkyl radical, the fruit can then be frozen without the development of objectionable off-flavor and will be effectively stabilized against off-flavor development over protracted periods of frozen storage. By the term "alkyl esters" is meant those esters derived from alkyl alcohols, which may be straight or branched-chain primary, secondary, or tertiary alcohols. In practice, it will be found advantageous to peel the grapefruit, after which the pulp will be cut into small sections for more effective treatment with one or more of the above off-flavor inhibitors which may be applied in any appropriate way. While this procedure is preferred, it will be apparent that the invention may be carried out in any manner which will effect contact of the off-flavor inhibitors with the pulp of the fruit.

Caffeic and hydrocaffeic acids have the following structural formulae:

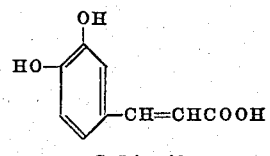
Caffeic acid

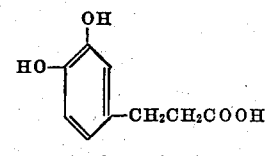
Hydrocaffeic acid

Both of these acids and their esters of any carbon content in the alkyl radical are effective anti-oxidants in citrus fruits at ordinary temperatures, yet only hydrocaffeic acid and the esters of caffeic and hydrocaffeic acids of the aforementioned limited carbon contents in the alkyl radical are effective off-flavor inhibitors in frozen grapefruit.

The aforementioned off-flavor inhibitors are all harmless substances which contribute no off-taste of their own in the relatively small amounts needed to produce the desired results in the frozen fruit, i. e., in the neighborhood of 0.02 gram of inhibitor per pound of fruit. The amount will vary somewhat depending on the particular substances used as inhibitors, as well as on such factors as the type of product to be marketed and the particular method used in applying the inhibitors to the fruit, but will always be in the above neighborhood so that the precise amount desired can be easily determined by trial under any particular set of conditions. My preferred inhibitors are ethyl caffeate, hydrocaffeic acid, and ethyl hydrocaffeate.

I have also found that the aforementioned inhibitors are most effective when they are employed with sugar. It is possible to mix the inhibitors with the sugar in a dry state and treat the pulp of the fruit with this dry mixture, prior to freezing, though it will generally be preferred to contact the pulp of the fruit with a sugar syrup containing the inhibitors in solution. Whether the sugar mixture is applied dry or in the form of a syrup, the juice of the fruit will be partly absorbed by the sugar mixture, while the sugar mixture will be partly dissolved in the juice. It is thus believed that the sugar functions as an effective carrier transferring the inhibitors to the innermost parts composing the pulp of the fruit.

Hydrocaffeic acid is very soluble in water, whereas the useful esters of caffeic and hydrocaffeic acids are only sparingly soluble. In the limited amounts employed for treatment, however, these esters can be dissolved in water or other aqueous vehicle by heating to moderate temperatures. Alternatively, they can be dissolved in alcohol and thereafter added to the aqueous vehicle, though this use of alcohol is not necessary to effect their solution.

The practice of the invention is illustrated by the following examples:

Example 1

Twelve ozs. of sliced sections of peeled grapefruit were treated with 4 ozs. of a 55% sugar syrup containing 0.02 gram of ethyl caffeate in solution. This syrup was prepared by dissolving the caffeate in the amount stated in 1.8 ozs. of hot water and adding 2.2 ozs. of cane sugar to the resulting solution. The treated fruit (including the added syrup) was packaged, quick frozen to 0° F., and stored at this low temperature for periods ranging from 24 hours to one year. Taste tests performed at the end of each storage period showed the fruit to have retained its original freshness and to have developed no off-flavor.

Similar procedures were carried out with caffeic and hydrocaffeic acids and with various alkyl esters of the two acids ranging from one to twelve carbon atoms in the alkyl radical. These tests showed the esters of caffeic acid to be effective off-flavor inhibitors up to six carbon atoms in the alkyl radical and the esters of hydrocaffeic acid to be effective off-flavor inhibitors up to ten carbon atoms in the alkyl radical. Hydrocaffeic acid was also found to be an excellent off-flavor inhibitor, but a pronounced off-flavor developed in the frozen fruit when caffeic acid was used.

Example 2

Samples of treated grapefruit were prepared in the same manner as in Example 1 except that the ethyl caffeate was dissolved in 0.6 gram of ethyl alcohol and thereafter added to the sugar syrup. After quick freezing these samples to 0° F., they were stored at this temperature for varying periods up to four months. As in Example 1, taste tests performed after each storage period showed no development of off-flavor in the treated fruit.

Example 3

Off-flavor development in the frozen fruit was effectively inhibited by treating the sliced sections, prior to freezing, with approximately 10% of dry sugar in admixture with 0.022 gram of ethyl caffeate per pound of fruit.

Example 4

Off-flavor development in the fozen fruit was effectively inhibited by dipping the sliced sections, prior to freezing, for 2 minutes in a 55% sugar syrup containing 0.018% of ethyl caffeate.

The following tests further illustrate the inhibiting effect of ethyl caffeate and at the same time clearly show the development of off-flavor in frozen grapefruit to be due to freezing.

Fresh grapefruit was peeled, sliced into small sections, and 12 ozs. of the sliced sections used in preparing each of the following samples:

Samples A-1 and A-2 received no treatment and were thus directly packaged.

Samples B-1 and B-2 were packaged after dipping for a few minutes in a 0.088% aqueous solution of ethyl caffeate.

Samples C-1 and C-2 were packaged with 4 ozs. of a 55% sugar syrup.

Samples D-1 and D-2 were packaged with the same amount of sugar syrup containing 0.02 gram of ethyl caffeate.

Within 1 hour after packaging, samples A-1 to D-1 were placed in an ordinary refrigerator for storage at 50° F., while samples A-2 and D-2 were placed in a freezer adapted to quick freeze them to 0° F. After remaining in this freezer for about 2 hours, samples A-2 to D-2 were immediately transferred to another freezer where they were kept frozen for a further period of approximately 10 to 12 hours. Samples A-2 to D-2 were then allowed to defrost in the open air reaching a temperature of 60° F. in about 6 hours, at which time samples A-1 to D-1 were removed from storage at 50° F. Within 1 hour after such defrosting of samples A-2 to D-2 and removal of samples A-1 to D-1 from cold storage, all samples were tested organoleptically with the following results:

| Sample | Preparation | Freezing | Off-Flavor |
|---|---|---|---|
| A-1 | Packed plain | No | None. |
| A-2 | do | Yes | Very bad. |
| B-1 | Packed after dipping in ethyl caffeate solution. | No | None. |
| B-2 | do | Yes | Possibly some, though not objectionable. |
| C-1 | Packed with sugar syrup | No | None. |
| C-2 | do | Yes | Bad. |
| D-1 | Packed with sugar syrup containing ethyl caffeate. | No | None. |
| D-2 | do | Yes | None. |

It will be noted that the frozen samples untreated with ethyl caffeate (A-2 and C-2) developed bad off-flavor, whereas none was developed in either the untreated or treated unfrozen samples (A-1 to D-1). Also, comparing the results achieved in the frozen samples treated with ethyl caffeate (B-2 and D-2), off-flavor development was more effectively inhibited when the ethyl caffeate was used with sugar (D-2) than when it was used without sugar (B-2).

It is to be understood that the invention is not restricted to the specific procedures, proportions of ingredients, and other particulars set forth in the foregoing examples, and that the desired off-flavor inhibitor or inhibitors may be applied in any manner which will insure effective contact with the pulp of the fruit. Reference should therefore be had to the appended claims for a definition of the limits of the invention.

What is claimed is:

1. A method of inhibiting the development of off-flavor in frozen grapefruit, which comprises treating the pulp of grapefruit with a substance selected from the group consisting of alkyl esters of caffeic acid of less than seven carbon atoms in the alkyl radical, hydrocaffeic acid, and alkyl esters of hydrocaffeic acid of less than eleven carbon atoms in the alkyl radical, and thereafter freezing the treated fruit, whereby it will be effectively stabilized against off-flavor development during freezing and subsequent frozen storage.

2. The method of claim 1 in which sections of the fruit are treated with said substance.

3. The method of claim 1 in which sections of the fruit are treated with said substance and with sugar.

4. A method of inhibiting the development of off-flavor in frozen grapefruit, which comprises treating sections of grapefruit pulp with sugar syrup containing a substance selected from the group consisting of alkyl esters of caffeic acid of less than seven carbon atoms in the alkyl radical, hydrocaffeic acid, and alkyl esters of hydrocaffeic acid of less than eleven carbon atoms in the alkyl radical, and thereafter freezing the treated fruit, whereby it will be effectively stabilized against off-flavor development during freezing and subsequent frozen storage.

5. The method of claim 4 in which the substance selected for treatment is ethyl caffeate.

6. The method of claim 4 in which the substance selected for treatment is hydrocaffeic acid.

7. The method of claim 4 in which the substance selected for treatment is ethyl hydrocaffeate.

8. A stabilized frozen grapefruit pack containing grapefruit pulp treated with an off-flavor inhibitor selected from the group consisting of alkyl esters of caffeic acid of less than seven carbon atoms in the alkyl radical, hydrocaffeic acid, and alkyl esters of hydrocaffeic acid of less than eleven carbon atoms in the alkyl radical.

9. A stabilized frozen grapefruit pack containing grapefruit sections impregnated with sugar syrup carrying an off-flavor inhibitor selected from the group consisting of alkyl esters of caffeic acid of less than seven carbon atoms in the alkyl radical, hydrocaffeic acid, and alkyl esters of hydrocaffeic acid of less than eleven carbon atoms in the alkyl radical.

10. The frozen grapefruit pack of claim 9 in which the off-flavor inhibitor is ethyl caffeate.

11. The frozen grapefruit pack of claim 9 in which the off-flavor inhibitor is hydrocaffeic acid.

12. The frozen grapefruit pack of claim 9 in which the off-flavor inhibitor is ethyl hydrocaffeate.

JOHN T. R. NICKERSON.

REFERENCES CITED

The following references are of record in the file of this patent:

UNITED STATES PATENTS

| Number | Name | Date |
| --- | --- | --- |
| 2,333,657 | Mattill et al. | Nov. 9, 1943 |
| 2,336,291 | Phillips | Dec. 7, 1943 |
| 2,336,928 | Denny | Dec. 14, 1943 |